United States Patent [19]

Kühne et al.

[11] Patent Number: 4,748,332
[45] Date of Patent: May 31, 1988

[54] APPARATUS FOR DETECTING THE LONGITUDINAL EDGES OF A ROD-SHAPED OBJECT

[75] Inventors: Manfred Kühne, Furtwangen; Reinhard Ulrich, Buchholz, both of Fed. Rep. of Germany

[73] Assignee: B.A.T. Cigarettenfabriken GmbH, Hamburg, Fed. Rep. of Germany

[21] Appl. No.: 22,319

[22] Filed: Mar. 5, 1987

[30] Foreign Application Priority Data

Mar. 5, 1986 [DE] Fed. Rep. of Germany ....... 3607244

[51] Int. Cl.$^4$ .......................................... G01N 21/86
[52] U.S. Cl. .................................... 250/560; 356/386
[58] Field of Search .............. 250/560; 356/385–387; 350/6.6, 173

[56] References Cited

U.S. PATENT DOCUMENTS

| | | | |
|---|---|---|---|
| 3,765,774 | 9/1975 | Petrohilos | 356/387 |
| 3,853,406 | 10/1974 | Zanoni | 356/387 |
| 3,856,411 | 12/1974 | Zanoni | 356/387 |
| 3,905,705 | 9/1975 | Petrohilos | 356/387 |
| 3,975,102 | 8/1976 | Rosenfeld et al. | 356/2 |
| 4,129,358 | 12/1978 | Wei | 350/173 |
| 4,168,126 | 9/1979 | Altman et al. | 356/386 |

FOREIGN PATENT DOCUMENTS

| | | |
|---|---|---|
| 2313439 | 9/1973 | Fed. Rep. of Germany . |
| 3302951 | 1/1983 | Fed. Rep. of Germany . |
| 3219389 | 11/1983 | Fed. Rep. of Germany . |
| 3229263 | 2/1984 | Fed. Rep. of Germany . |
| 1395910 | 5/1975 | United Kingdom . |

OTHER PUBLICATIONS

Zyogo Leaflet, "Beruhrungsfreies Laser-Messsystem", (Contactless Laser Measuring System).

*Primary Examiner*—David C. Nelms
*Assistant Examiner*—Crystal D. Cooper
*Attorney, Agent, or Firm*—Armstrong, Nikaido, Marmelstein & Kubovcik

[57] ABSTRACT

An apparatus for detecting the longitudinal edges of a rod-shaped object moving in its longitudinal direction, in particular a tobacco or filter rod, comprises a light source, at least one beam divider for dividing the light beam coming from the light source into at least two light beams sweeping over the edge regions of the object, an optical deflection system for sweeping the two light beams over the object, two photodetectors for the light beams and an evaluating means for determining the position of the longitudinal edges from the instants of the bright/dark transitions at the two photodetectors on the one hand and the instantaneous positions of the light beams on the other hand. The or each beam divider generates two light beams which are parallel to each other and move in opposite directions over the object.

12 Claims, 5 Drawing Sheets

FIG. 2
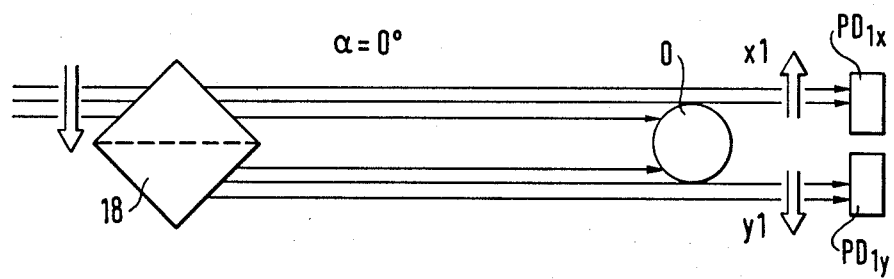
(a) $\alpha = 0°$
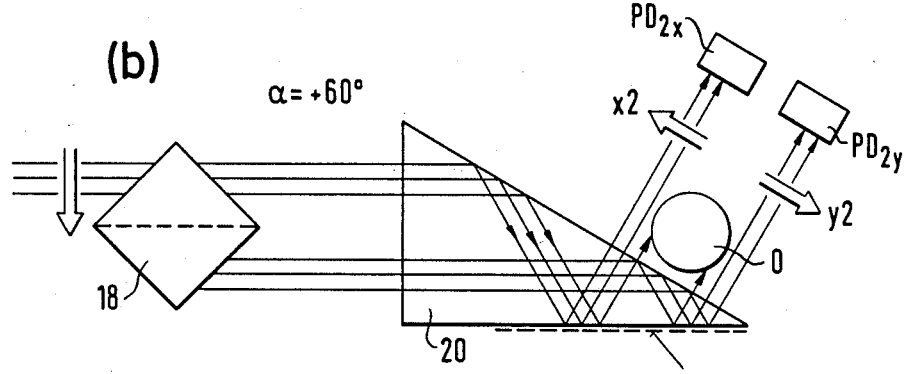
(b) $\alpha = +60°$
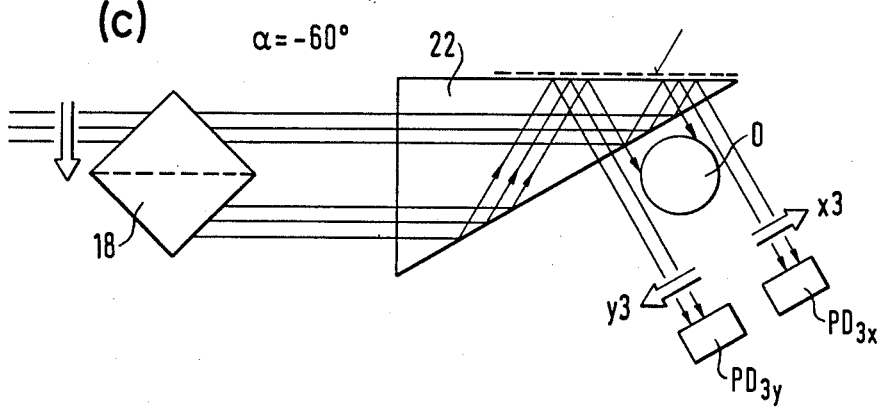
(c) $\alpha = -60°$ FIG. 3
(a)
N=2
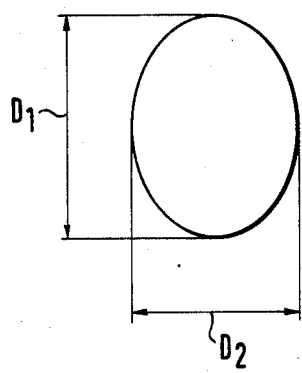
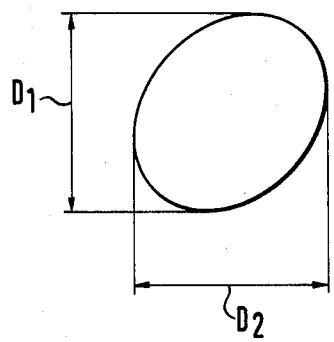
(b)
N=3
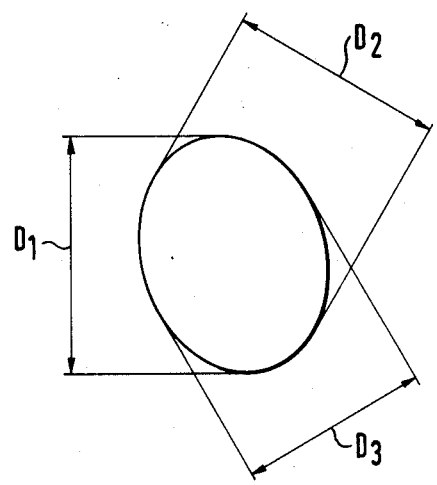

APPARATUS FOR DETECTING THE LONGITUDINAL EDGES OF A ROD-SHAPED OBJECT

BACKGROUND OF THE INVENTION

1. Field of the Invention

The invention relates to an apparatus for detecting the longitudinal edges of a rod-shaped object moved in its longitudinal direction, in particular a tobacco or filter rod.

2. Description of the Prior Art

Although similar problems are also encountered with other rod-shaped objects, for example pencils, or cables, wires, etc., hereinafter only the corresponding problems in the production of smokable articles, that is cigarettes, in particular filter cigarettes, will be discussed.

To ensure a constant high quality in the production of (filter) cigarettes the diameter on the one hand and the roundness of the tobacco rod and/or filter rod on the other hand should be constantly monitored. The output signals of the associated preferably automatically operating diameter and roundness measuring systems could be used on deviations from predetermined desired values to make the necessary corrections in the production processes via a closed-loop control system.

Because of the high rod velocity, generally of the order of some meters per second, for this purpose only a contactless measuring technique can be used. German OS No. 3,302,951 discloses a measuring method operating with ultrasonic waves; pneumatic methods and optical scanning methods using laser beams are already available on the market.

In the pneumatic method the material rod to be measured runs through a nozzle whose diameter is only somewhat greater than the maximum rod diameter. An air flow is blown through the annular gap remaining between the nozzle and rod and the flow resistance of the gap determined, it then being possible to calculate the cross-sectional area of the rod from the flow resistance. This measuring method does not enable any information to be obtained on the roundness of the rod and consequently the diameter of the rod can only be determined if it is assumed that a perfect cylindrical body is involved.

A further difficulty in the practical use of this method resides in the air permeability of the cigarette or filter paper which moreover can change in the course of time, resulting in corresponding measurement errors. A higher air permeability increases namely the air throughput, giving the appearance of a smaller diameter.

Optical scanning methods operating with laser beams are for example known from U.S. Pat. Nos. 3,856,411, 3,765,774, 3,905,705, 3,975,102 and the prospectus of the Zygo company "Berührungsfreies Laser-Meßsystem" ("Contactless laser measuring system").

An apparatus also operating with laser beams for detecting the longitudinal edges of a rod-like object of the aforementioned type moving in its longitudinal direction is also known from U.S. Pat. No. 3,853,406 and comprises a light source for generating a light beam, at least one beam divider dividing the beam coming from the light source into at least two light beams sweeping over the edge regions of the object, an optical deflection system for sweeping the two light beams over the object, at least two photodetectors disposed behind the object in the beam direction and an evaluating means for determining the position of the longitudinal edges from the instants of the bright/dark transitions at the two photodetectors on the one hand and the instantaneous position of the light beams on the other. The passage of the two beams at the longitudinal edges of the object is determined via the first and second derivative of the output signals of the two photodetectors in order to find exactly the instant at which the centre of each laser beam coincides with an edge of the object.

Thus, in principle the desired diameter is determined from the time interval of the bright/dark transitions compared with the travelling speed of the beam. Since this method is independent of the air permeability of the cigarette or filter paper, fundamentally very good measuring accuracy of about 1 $\mu$m can be achieved.

However, the following problem then arises: Due to transverse rod oscillations or the rapid longitudinal movement of a rod which is not perfectly cylindrical transverse velocities of the order of magnitude of 10 to 100 mm/s can occur and lead to measurement errors of the order of magnitude of 10 to 100 $\mu$m in the diameter. Although by taking an average of a large number of measured values a mean value, for example for 100 cigarettes, can be calculated with a substantially smaller error, the answer to the important question in practical assessment of quality as regards the change of diameter from one cigarette to the next or from one end of a filter cigarette to the other cannot be obtained because of the errors originating from the transverse movements.

SUMMARY OF THE INVENTION

The invention therefore has as its object to provide an apparatus for detecting the longitudinal edges of a rod-shaped object moving in its longitudinal direction, in particular a tobacco or filter rod, of the aforementioned type, with which the disadvantages referred to above are avoided. In particular, an apparatus is proposed whose measuring accuracy within a range decisive in practice is not influenced by the lateral movements of the object.

The invention therefore proposes in such an apparatus for detecting the longitudinal edges of a rod-shaped object moving in its longitudinal direction, in particular a tobacco or filter rod, comprising a light source for generating a light beam, at least one beam divider dividing the light beam coming from the light source into at least two light beams sweeping over the edge regions of the object, an optical deflection system for sweeping the two light beams over the object, at least two photodetectors arranged in the beam direction behind the object, and an evaluating means for determining the position of the longitudinal edges from the instants of the bright/dark transitions at the two photodetectors on the one hand and the instantaneous position of the light beams on the other hand, the improvement that the or each beam divider generates two light beams which are parallel to each other and which move in opposite direction over the object.

Advantageous forms of embodiment are set forth in the subsidiary claims.

The advantages achieved with the invention are based on the following mode of operation: In the radial direction of the object the scanning takes place simultaneously by light beams parallel to each other, in particular laser beams, the scanning or sweep movements of which take place in opposite directions, analogously to the movements of the jaws of parallel tongs closing or opening. If the positions of the two light beams at the instant at which they pass the edges of the object are denoted by x and y, the desired diameter D of the object, for example a tobacco or filter rod, is $$D = x + y + C.$$

C is a constant which depends on the selected starting points of the x and y counting and can be determined, for example, through calibration by measuring a body of known diameter.

This tongs-like movement of the two light beams over the object leads to a reduction of errors due to the transverse movements of the object. For by using two light beams with opposite sweeping movements the upper and lower longitudinal edge of the object are detected almost simultaneously. This is in any case strictly true when the object is in the centre position defined by the location of the two "scanning windows". It applies however also to a very good approximation when the object moves somewhat, for example the distance $\delta x_1$, outside said centre position. The magnitude $\delta s$ of the measuring error due to a transverse movement of the object is about $$\delta s = v \delta \tau$$

where
 v = velocity component of the object parallel to the sensing or scanning direction, and
 $\delta \tau$ = time between the scanning of the upper and lower object edge.

This time interval $\delta \tau$ when scanning with two oppositely moving beams is only $$\delta \tau = 2 \delta x_1 / v_s$$

where $v_s$ is the scanning velocity, i.e. the movement speed of the light beams, thus giving a movement error of $$\delta s_1 = (v/v_s) 2 \delta x_1$$

Since in practice the velocity component of the object parallel to the scanning direction v can be made substantially smaller than the scanning velocity $v_s$, the measurement error $\delta s_1$ is substantially less than the movement of the object out of the centre position $\delta x_1$. Such a low value cannot be achieved with the known parallel displacement of the two light beams.

The two oppositely moving scanning light beams are advantageously produced by splitting a single primary scanning beam by means of a beam divider because then their sweeping movements can be produced by the same sweeping system disposed in front of the beam divider and are therefore exactly synchronous. In a preferred embodiment a so-called "beam divider cube" is used which consists of two 45°/90° ridge prisms cemented together at their hypotenuse faces. One of the hypotenuse faces is metallized to be partially transparent so that part of the incident primary scanning light beam passes through whilst a second part is reflected. Due to this reflection the reflected beam moves in the opposite sense to the light beam which passes through the hypotenuse faces.

Instead of such a beam divider cube a so-called "Köster prism" can also be used.

Due to the tongs-like movement of the two light beams it is also possible to employ a very much simpler and thus cheaper lens than in the known apparatus. For in the apparatus according to the prior art the width of the scanning region must be greater by an adequate amount than the maximum possible diameter of the object to be measured plus twice the possible deviations from the centre position.

With the tongs-like movement of the two light beams a substantially smaller scanning or sweeping width suffices which is governed by the difference between the diameter of the guide opening for the object and the minimum possible object diameter. The size and thus the aperture width of the lens can thus be reduced by a factor of about 4 with the other parameter values equal.

This reduction of the scanning width also means a reduction of the necessary scanning angle at the beam deflector. With otherwise the same parameter values the scanning angle can be reduced by the same factor as the lens aperture. This correspondingly reduces the demands made of the deflection mechanism for the beam movement so that a simpler, smaller and/or faster deflector can be used.

In an implemented embodiment of this apparatus it was possible to replace the otherwise usual very complicated and not very reliable deflection by means of a motor-driven rotating polygonal mirror by a deflection using an elastically suspended oscillating mirror.

To determine the diameter of a running cigarette or filter rod no universal measuring device is necessary covering the entire diameter plus a fluctuation region. Since the cigarette or filter rod always has a certain minimum diameter, the measuring instrument must only cover a smaller range between the minimum diameter and the fluctuation range. Such a device adapted to the specific measuring task can be made considerably more economically than a universal device; moreover, because of the correspondingly reduced measurement scope it can also operate considerably faster.

Such a measuring apparatus can also be used by providing corresponding additional beam dividers and associated photodetectors for scanning the rod to be measured in a plurality of azimuthal directions simultaneously to determine deviations from the ideal round cross-sectional form of the object.

It has been found that measurements in at least three azimuthal directions are necessary to determine the simplest possible deviation of the object cross-section from the ideal round form in reliable manner.

By using suitable deflection prisms it is possible to obtain the six scanning light beams necessary for this purpose from three primary light beams parallel to each other. The latter can be generated in simple manner in the beam deflector and moved in exact synchronism.

For the evaluation of the bright/dark or dark/bright transitions detected by the associated six photodetectors, at the instants of said transitions the particular actual positions of said scanning beams must be exactly determined. For this purpose a total of three reference signals is used and said signals are taken from the associated photodetectors. The latter receive three further scanning light beams which are generated additionally to the aforementioned light beams by beam division. This ensures that all the nine scanning light beams are always moved in exact synchronism with each other.

The optical deflection system is preferably so constructed that it does not only deflect the collimated light beam coming from a common light source but simultaneously also divides said beam into the necessary primary light beams which are required for said nine scanning functions, i.e. into the three measuring beam pairs when scanning in three azimuthal directions, the reference beam pair and the position reference beam. For this purpose on the mirror of the deflection system a phase grid or grating is applied whose grating lines extend perpendicularly to the rotation oscillation axis of the mirror. The diffraction orders formed by diffraction of the light at the grating can be used directly as primary light beams.

BRIEF DESCRIPTION OF THE DRAWINGS

The invention will be described in detail hereinafter with the aid of examples of embodiment with reference to the accompanying diagrammatic drawings, wherein:

FIGS. 2a, 2b, and 2c show essential parts of an embodiment of an apparatus for detecting the longitudinal edge of a tobacco or filter rod with scanning in three planes, FIGS. 3a and 3b show schematic diagrams for determining the deviations from roundness.

DESCRIPTION OF THE PREFERRED EMBODIMENT

Figure 1:
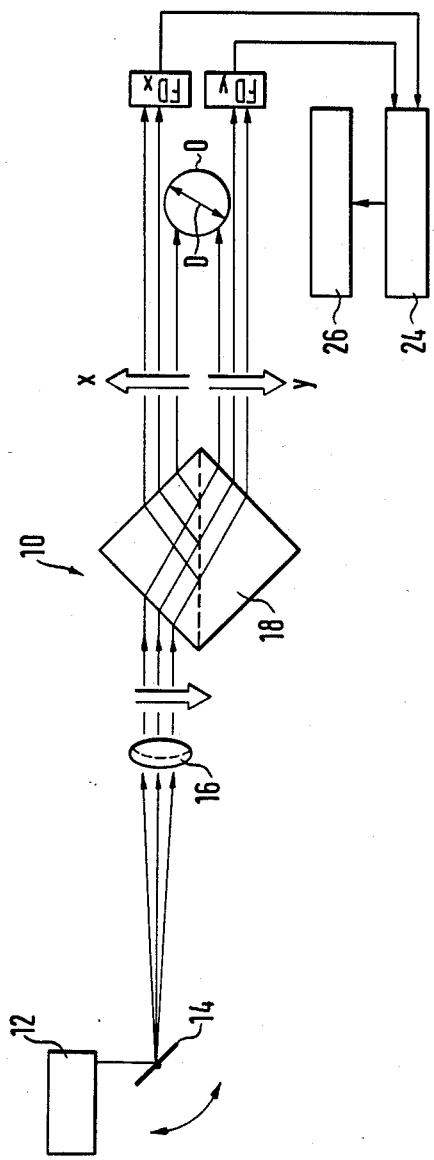
FIG. 1 shows the basic construction of an apparatus for detecting the longitudinal edges of a cigarette or filter rod with scanning in a single plane.

The apparatus shown in FIG. 1 and denoted generally by the reference numeral 10 for detecting the longitudinal edges of a tobacco or filter rod 0 with the diameter D comprises a laser light source 12 which generates a collimated laser light beam. Instead of a laser beam it is also possible to use any other suitable light source; the essential point is only that it supplies light which is spatially as coherent as possible and has a wide spectrum band (to avoid interferences). In particular, a super-radiation diode can be used instead of a laser light beam source.

The collimated light beam from the light source 12 is incident on an oscillating mirror 14 which executes a periodic reciprocation with defined velocity. The beam pencil generated by reflection at the oscillating mirror 14 is converted by a scanning lens 16 into a pencil of parallel light beams and is incident on a beam divider 18 which in the embodiment according to FIG. 1 is formed by a beam divider cube. Such a beam divider cube consists of two 45°/90° ridge prisms cemented together at their hypotenuse faces; one of the hypotenuse faces is partially metallized so that part of the incident primary scanning light beam passes therethrough whilst another part is reflected. Due to this reflection the reflected light beam moves in the opposite direction to the light beam which passes through the hypotenuse faces, i.e. the two parallel beam pencils leaving the beam divider 18 execute sweeping movements in opposite directions analogous to the movements of the jaws of parallel tongs closing or opening, as indicated in FIG. 1 by the arrows.

Instead of such a beam divider cube 18 a so-called "Köster prism" may be used or any other arrangements known in optics for generating two sub-beams having these properties.

The upper sub-beam according to the illustration of FIG. 1 scans the upper edge of the rod 0 and the lower sub-beam the lower edge of the rod 0, i.e. the sweep regions of the two sub-beams must be configured such that all the possible positions of the two longitudinal edges of the rod can be detected. In the production of tobacco or filter rods the corresponding diameter fluctuations are small and consequently the operations can be carried out with an extremely small sweep region of the two sub-beams.

Disposed behind the rod 0 in the beam direction are two separate photodetectors FDx, FDy which are formed by suitable photoelectric transducers and generate electrical signals corresponding to the incident light intensities. These signals are supplied to an evaluating means 24 which forms from the two output signals of the photodetectors FDx, FDy on the one hand and reference signals still to be explained on the other hand the measurement result which is represented on a display device 26.

If the positions of the two scanning light beams at the instant at which they pass the edges of the rod 0 are denoted by x and y respectively, the desired diameter D of the rod 0 is given by $$D = x + y + C$$

C is a constant which depends on the selected starting or end points of the x and Y counting and can be determined for example by measuring an object 0 of known diameter.

After corresponding calibration of the apparatus 10, i.e. definition of the constant C, from the positions x and y, again corresponding to the bright/dark transitions on the photodetectors FDx, FDy, signals can be obtained which represent the diameter D of the object 0.

The mode of operation shown in FIG. 1 can also be employed for determining the roundness of the rod 0 in that the rod to be measured is scanned in a plurality of azimuthal directions and thus any deviations from the ideal round cross-sectional form are detected. FIG. 2 shows the associated optical part for scanning in three azimuthal directions.

As theoretical considerations show, the scanning must be carried out in at least three azimuthal directions to detect with certainty the simplest possible deviation of the rod cross-section from the ideal round form. The simplest deviation from the desired circular cross-sectional form is an elliptical distortion. If it is scanned (see FIG. 3a) in only two different azimuthal directions it will depend on the particular orientation of the distortion whether the two diameter values $D_1$ and $D_2$ are in fact different and thus indicate the distortion, or whether this is not the case. In the right part of FIG. 3a there is a position of the rod in which the two diameter values $D_1$ and $D_2$ are identical whilst in the position illustrated in the left diagram of FIG. 3a clearly different diameter values $D_1$ and $D_2$ result.

When scanning in three azimuthal directions three different diameter values $D_1$, $D_2$ and $D_3$ (see FIG. 3b) are obtained so that any elliptical distortion can be detected with certainty. From the three measured diameter values $D_1$, $D_2$ and $D_3$ offset by 120° with respect to each other, a mean of the diameter representative for both the cross-sectional area and the circumference can be calculated. In addition, from these three values the amount of the elliptical distortion and the azimuthal orientation thereof can be derived.

The determinations of the three different diameters $D_1$, $D_2$ and $D_3$ necessary for such a distortion analysis are carried out with the apparatus 10 according to FIG. 1, in three successive planes as close as possible to each other perpendicular to the direction of the rod 0. The pairs of scanning light beams lying in the these three planes are apparent in FIG. 2. FIG. 2a shows for a deflection angle $\alpha = 0$ the makeup of the apparatus 10 according to FIG. 1 which detects the rod diameter designated in FIG. 3b by $D_1$.

In the next plane, see FIG. 2b, by using a special deflection prism 20 the light beam pair leaving the beam divider 18 is deflected by double reflection at the side faces of the deflection prism 20 jointly by an angle $\alpha = +60°$ without the two light beams losing their parallelism and their opposite scanning movements. These two light beams thus detect the diameter of the rod 0 designated in FIG. 3b by $D_2$.

Finally, in the third plane, see FIG. 2c, the pair of scanning light beams is deflected by means of a second deflection prism 22 through an angle $\alpha = -60°$ to detect the rod diameter designated by $D_3$.

The associated tongs-like scanning movements of the total of six scanning light beams are denoted in FIG. 2 by x1, y1; x2, y2 and x3, y3. The shadings or brigh/dark transitions of these six scanning light beams are detected by the six associated photodetectors $PD_{1x}$, $PD_{1y}$ (see FIG. 2a), $PD_{2x}$, $PD_{2y}$ (see FIG. 2b) and $PD_{3x}$, $PD_{3y}$ (see FIG. 2c) and converted to corresponding electrical signals which are then converted by the electronic evaluating means 24 to the three diameter values $D_1$, $D_2$, $D_3$; it is then possible to obtain and display therefrom the actual quantities of interest, i.e. the average diameter of the tobacco rod, the difference between the maximum and minimum diameter of the tobacco rod and the azimuthal orientation of any distortion present.

The use of the two deflection prisms 20, 22 according to FIG. 2 has compared with other possible embodiments the advantage that all the necessary six scanning light beams can be obtained from three parallel primary light beams. These three parallel primary scanning light beams can in turn be generated in a simple manner with one common beam deflector and swept synchronously with each other as will be explained below. The angles of the deflection prisms 20, 22 necessary for a 60° deflection are 30°/60°90°. One cathetus of the prisms must be metallized to obtain the desired reflections of the light beams. Their hypotenuses need however not be metallized because at them a total reflection takes place.

In an implemented embodiment of this principle of triple scanning the deflection prisms 20, 22 have a hypotenuse of 60 mm length whilst the three measuring planes according to FIG. 2 are at intervals of 5 mm.

For the evaluation of the bright/dark or dark/bright transition signals furnished by the six photodetectors $PD_{1x}$, $PD_{1y}$, $PD_{2x}$, $PD_{2y}$, $PD_{3x}$, $PD_{3y}$ the positions of the six scanning light beams at the instants of these transitions must each be exactly defined. For this purpose a total of three reference signals is employed and these signals are taken from the three photodetectors designated in FIG. 4 by $PD_{ox}$, $PD_{oy}$ and $PD_R$. These photodetectors receive three further scanning light beams $x_0$, $y_0$ and $x_R$ which are generated in addition to the previously mentioned light beams $x_1$, $y_1$, $x_2$, $y_2$, $x_3$, $y_3$ by beam division. It is ensured in this manner that all the nine scanning light beams always move in exact synchronism with each other.

The reference light beam denoted by $x_r$ passes through a precision grating with exactly known grating constant $g_0$ (see FIG. 4) before it is incident on the photodetector $PD_R$. Due to the scanning movement of this light beam $x_R$ said photodetector $PD_R$ produces an alternating signal $S_R$ and each period of said signal corresponds to a movement through a grating constant $g_0$. To increase the resolution this alternating signal is further frequency multiplied by a factor m, for example with m = 32. In the signal $S_m$ thus generated one period then corresponds to a movement of all the scanning light beams through the distance $g = g_0/m$. This distance is used in the evaluation as measurement unit.

All other distances, in particular the three desired diameters $D_1$, $D_2$ and $D_3$, are represented internally in the evaluation as multiples of the distance g.

In this sense the signal $S_m$ is supplied to an electronic up/down counter X, for example with a resolution of 12 bits, which counts the periods of the signal $S_m$. Said counter X also receives a logic signal $S_\pm$ from the drive of the beam deflector, that is of the oscillating mirror 14, which indicates whether all the scanning light beams happen to be in the directions (+) shown in FIG. 4 or are moving during the second half period of the mirror movement in the opposite direction (−). In accordance with the value of the signal $S_\pm$ the counter X counts up or down. In addition, the counter X is reset to 0 at the start of each counting operation, i.e. on each change of the signal $S_\pm$. The instantaneous count of the counter X during the scanning operation thus corresponds in each case exactly to the position of all eight other scanning light beams $x_i$, $y_i$ with i = 0, 1, 2, 3.

The starting point of this counting and thus of the eight scanning movements remains however initially undefined during each scanning operation because it depends for example on the absolute position of the grating $g_0$ and on the electrical delay times of the frequency multiplier.

Figure 4:
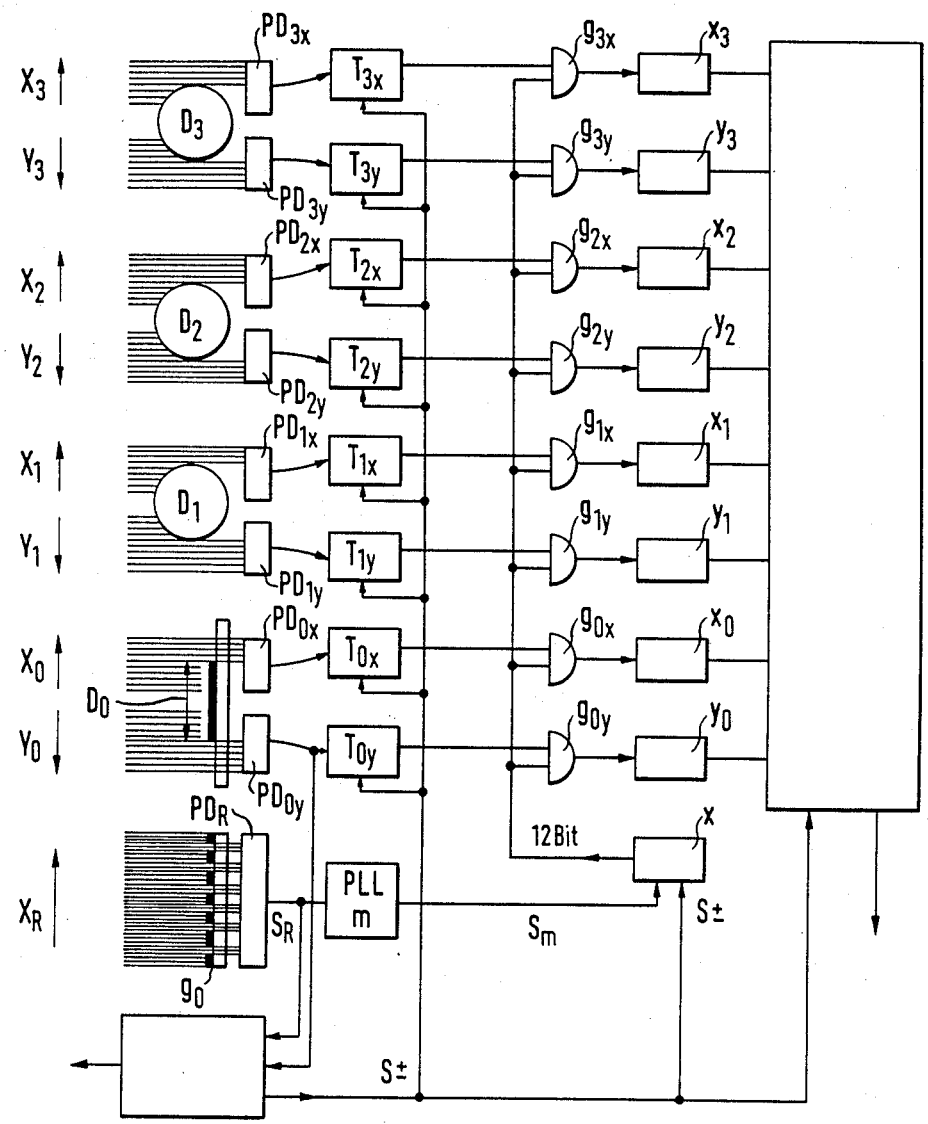
FIG. 4 shows the makeup of a circuit arrangement for generating reference signals and evaluating the various signals.

To determine the three diameter values $D_1$, $D_2$, $D_3$ the count of the counter X is read whenever one of the six scanning beams passes the longitudinal edge of the rod 0, i.e. when the output signal of one of the six associated photodetectors registers a dark/bright transition (during the positive half period of the scanning movement illustrated in FIG. 4) or a bright/dark transition (during the other negative half period). These transitions are evaluated in discriminator and trigger stages $T_{0x}$, $T_{0y}$, $T_{1x}$, $T_{1y}$, $T_{2x}$, $T_{2y}$, $T_{3x}$ and $T_{3y}$ which are connected to the corresponding photodetectors $PD_{0x}$, $PD_{0y}$ ... $PD_{3y}$. Whenever the respective output signal of the photodetector passes a level which is equal to half its maximum height the associated discriminator and trigger stage furnishes a short needle pulse. To obtain certain distinction between the dark/bright transitions and the bright/dark transitions the already-mentioned logic signal $S_\pm$ is supplied to all the trigger stages.

Each needle pulse of, the discriminator and trigger stages opens an associated gate $g_{0y}$, $g_{0x}$, $g_{1y}$, $g_{1x}$, $g_{2y}$, $g_{2x}$, $g_{3y}$, $g_{3x}$ which transfers the instantaneous count of the counter X to counters $X_0$, $Y_1$, $X_1$, $Y_2$, $X_2$, $Y_3$, $X_3$, i.e. to the gates on the one hand the output signals of the discriminator and trigger stages are supplied and on the other hand the output signal of the counter X so that when both the signals are present simultaneously they pass the count of the counter X to the other counters.

At the end of a scanning operation the various counters $X_1$, $Y_1$, $X_2$, $Y_2$, $X_3$, $Y_3$ thus contain counts representing the positions of the longitudinal edges of the rod 0.

A microprocessor reads the counts of these six counters and calculates the associated diameter values $D_1$, $D_2$ and $D_3$, expressed in units g, in accordance with the relationship $$D_i = X_i + Y_i + C \quad (i = 1, 2, 3)$$

The still unknown constant C is determined with the aid of a reference pair of scanning beams which are denoted in FIG. 4 by $x_0$ and $y_0$. They correspond in every respect to the three pairs of scanning light beams which scan the rod 0 to be measured. However, the pair of reference light beams scans a precision mask of exactly known width $D_0$ which corresponds substantially to the mean diameter of the rod 0. With the associated counts of the counters $X_0$ and $Y_0$ the constant C can be calculated from the known width $D_0$ of the mask as follows:

$$C = D_0 - X_0 - Y_0$$

From these quantities it is now possible to calculate the three desired diameters $D_1$, $D_2$ and $D_3$ and all other quantities derived therefrom, such as the ellipticity of any deviation from the ideal circular form of the cross-section of the rod, the area or the circumference of the rod.

The mean diameter $\overline{D}$ of the rod is obtained as mean value of the three individual diameters.

$$\overline{D} = (D_1 + D_2 + D_3)/3$$

The deviation from the roundness is designated by a difference $\Delta$ which is present between the maximum and minimum diameters of an ellipse adapted to the cross-section. This difference can be determined as follows from the measurements:

$$\Delta = \tfrac{4}{3}(D_1^2 + D_2^2 + D_3^2 - D_1 D_2 - D_1 D_3 - D_2 D_3)^{\frac{1}{2}}.$$

As explained above, the single well collimated laser beam generated by the laser light source 12 impinges on the oscillating mirror 14 which serves as beam deflector. Said oscillating mirror 14 is secured together with a permanent magnet on a taut wire which serves as torsion spring. The frequency of the oscillation of the mirror 14 thus depends substantially on the torsion moment of the wire and the moment of inertia of the mirror/permanent magnet combination. In an implemented embodiment the frequency of the oscillation is 600 Hz. This gives a total of 1200 measurements/sec. Thus, with a velocity of the tobacco or filter rod 0 of 6 m/s after every 5 mm a triple determination of the diameter of the rod 0 is carried out, i.e. on every single cigarette about 50 diameter determinations are made.

The permanent magnet connected to the oscillating mirror 14 serves as drive source for the oscillations via a small magnetic alternating field generated by a coil. Said field is produced by an alternating current which in turn is derived in a feedback circuit from one of the detector signals, for example the output signal of the photodetector $PD_{y0}$ (see FIG. 4). The amplitude, of the torsion oscillation must however be stabilized via a closed-loop control circuit. Conveniently, the mean frequency of the detector signal $S_R$ of the photodetector $PD_R$ is used as measure of the amplitude.

In an implemented embodiment having a measuring range of 2.5 mm, i.e. the width to be covered of the light beam generated by the beam divider 18, each scanning light beam covers a total region of about 5 mm width. With a focal length of the scanning lens 16 of 91 mm the amplitude of the angular movement of the primary light beam, i.e. the angle over which the single reflected light beam originating from the oscillating mirror 14 sweeps, is 0.055° and the amplitude of the torsion oscillation of the oscillating mirror 14 is half that amount, i.e. 0.0275°.

The optical deflection system is conveniently so constructed that it not only deflects the collimated light beam but also divides it simultaneously into the five primary light beams required for the five scanning functions (see FIG. 4), i.e. into the three measuring beam pairs $X_1$, $Y_1$, $X_2$, $Y_2$, $X_3$, $Y_3$ for determining the diameters $D_1$, $D_2$, $D_3$, the reference beam pair $x_0$, $y_0$ for the determination of the width $D_0$ of the mask and for the grating position reference $x_R$. For this purpose a phase grating is applied to the mirror of the deflection system and the grating lines thereof extend perpendicularly to the rotation oscillation axis of the mirror. The diffraction orders arising by diffraction of the light at the grating can be used directly as the required primary scanning light beams.

Figure 5:
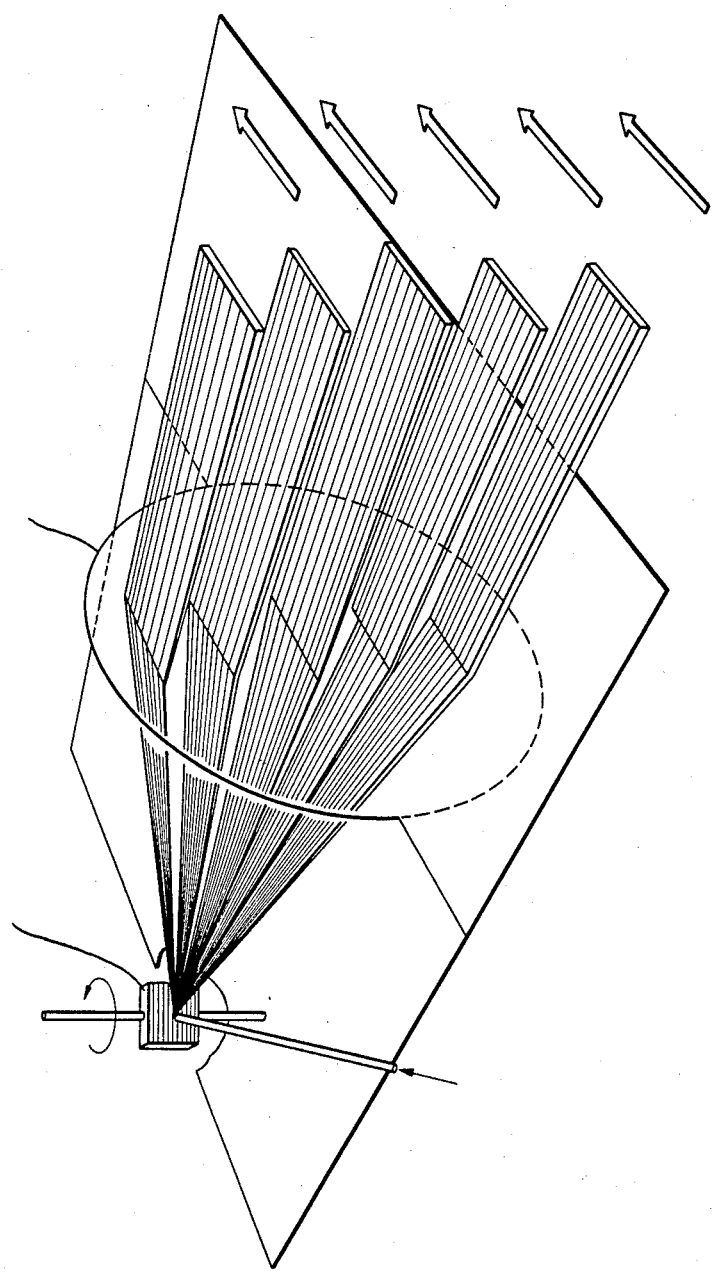
FIG. 5 shows the division of the collimated light beam into five parallel primary light beams by a phase grating applied to the deflection mirror.

A corresponding construction is apparent from FIG. 5. The collimated laser beam is incident on a deflection mirror which is provided with the aforementioned phase grating. A total of five scanning light beams is generated which are converted by the scanning lens 16 into parallel scanning light beams. In FIG. 5 the scanning or sweeping movements of said five primary light beams are indicated.

The individual parallel scanning light beams originating from the scanning lens 16 run to the beam divider 18 which performs the further division for the "parallel tongs movement" according to FIG. 1.

With regard to the configuration of the phase grating it is pointed out that its grating constant governs the angular spreading and fanning out perpendicularly to the plane of the scanning movement. By suitable choice of the phase amplitude and groove form of the grating a division into the five primary scanning light beams can be achieved such that all the light beams have approximately the same intensity. The theoretical considerations necessary for a suitable configuration of the phase grating are contained in the article "Binary Phase Gratings for Star Couplers with High Splitting Ratio" by U. Killat, G. Rabe and W. Rave, which appeared in the journal "Fiber and Integrated Optics", Vol. 4, p. 159–167. The ideas explained therein for transmission gratings can readily be applied to reflection gratings.

In an implemented embodiment the phase grating has a grating constant of 14.4 $\mu$m and consists of 3 $\mu$m wide and 0.2 $\mu$m thick strips on a plane substrate. Onto said grating a thin aluminium coating is vapour deposited as reflection layer. This resulted in a division with which the intensity ratio between the strongest and weakest of the five primary scanning light beams is better than 2:1.

The particular advantage of such an arrangement for the simultaneous deflection and division of the light beam resides on the one hand in saving separate components otherwise required for these two functions and on the other hand in the double utilization of the scanning lens 16. The latter is normally used to convert the angular motion of the deflected beam into a parallel scanning movement. For this purpose the deflection centre must be located in the first focus of the scanning lens 16. If now the phase grating is applied directly to the oscillating mirror 14 the phase grating will also be in the first focus of the lens so that after passing through the scanning lens 16 the individual diffraction orders of the phase grating extend in the form of parallel beams all executing simultaneously the same scanning movement.

We claim:

1. Apparatus for detecting the longitudinal edges of a rod-shaped object moved in its longitudinal direction, in particular a tobacco or filter rod comprising
    (a) a light source for generating a light beam,
    (b) at least one beam divider dividing the beam coming from the light source into at least two light beams sweeping over the edge regions of the object,
    (c) an optical deflection system for sweeping the two light beams over the object,
    (d) at least two photodetectors disposed behind the object in the beam direction, and
    (e) an evaluating means for determining the position of the longitudinal edges from the instants of the bright/dark transitions at the two photodetectors on the one hand and the instantaneous position of the light beams on the other, wherein
    (f) the or each beam divider generates two light beams which are parallel to each other and which move in opposite directions over the object.

2. Apparatus according to claim 1, wherein the beam divider generates in at least three planes two light beams which are parallel to each other in each case and which move in opposite directions over the object.

3. Apparatus according to claim 2, wherein the beam divider is formed by a beam divider cube.

4. Apparatus according to claim 2, wherein the beam divider is formed by a Köster prism.

5. Apparatus according to claim 1, wherein a total of at least three beam dividers is provided for scanning the longitudinal edges of the object in at least three different azimuthal directions.

6. Apparatus according to claim 1, wherein the single light beam reflected at the optical deflection system is incident on a scanning lens which generates parallel scanning light beams.

7. Apparatus according to claim 6, wherein the scanning lens is followed by the beam divider.

8. Apparatus according to claim 1, wherein the optical deflection system is formed by an oscillating mirror.

9. Apparatus according to claim 8, wherein on the oscillating mirror a phase grating is applied to generate a plurality of primary scanning light beams.

10. Apparatus according to claim 1 comprising a reference beam pair for scanning a mask of constant width, two photodetectors for the reference light beams passing through the mask and an evaluating means for obtaining a calibration signal from the output signals of the two photodetectors.

11. Apparatus according to claim 1, wherein the light source is formed by a laser light source.

12. Apparatus according to claim 1, wherein the light source is formed by a super-radiation diode.

* * * * *